3,224,899
WETTABLE POLYURETHANE SPONGE
Christopher L. Wilson, 207 Shadow Valley,
High Point, N.C.
No Drawing. Filed Aug. 17, 1961, Ser. No. 132,237
1 Claim. (Cl. 117—98)

This invention relates to the manufacture of a urethane foam suitable for use as a sponge. Open cell polyurethane flexible foam made from either polyester or polyether and a diisocyanate by either a one shot or a prepolymer process is now old in the art. Such foams have proved very useful in cushioning, bedding, packaging, insulation and padding but use of the foam as a sponge has been seriously limited by very poor wettability by water. To be a good sponge it is not sufficient to have an attractive open pore structure but in addition the foam must be rapidly wetted so that water is rapidly absorbed into the pores. The amount of water that is held in the pore structure under specified conditions of test is of some importance in determining usefulness but by far the most important characteristic is wettability. Wettability determines the efficiency and completeness with which a sponge will remove water from surfaces such as tables, floors or windows. Any structure with holes will hold a certain amount of water but such a feature alone does not constitute a good sponge.

The poor wettability of urethane foam has not, however, prevented it being made for and sold as a sponge, but the commercial item is not satisfactory and falls far short of a natural, reconstituted cellulose or polyvinyl alcohol-formal sponge as presently available in commerce. One-shot polyester foam made with an attractive pore structure resembling a natural sponge has been made and sold in Europe since about 1954 and more laterly in the United States but its wettability is just not good. Polyether foam whether prepolymer or one-shot is even less wettable than polyester foam.

Attempts have been made to improve the wettability of a urethane foam. For instance the wettability of polyester foam is improved by hydrolysis of the surface. This may be carried out deliberately by treatment with caustic alkalies or made to occur in use. A polyester sponge of poor wettability becomes more hydrophilic in use but thereafter hydrolysis continues and the sponge disintegrates.

There is prior art dealing with improving wettability of polyurethane foams by depositing hydrophilic material on the surface of the pores. For example polyvinyl or cellulose acetate may be deposited from organic solution and subsequently hydrolysed to give a polyurethane foam of improved wettability. Such procedures are described in U.S. Patent 2,900,278 and French Patent 1,176,772. A different approach is described in U.S. Patent 2,990,378 and involves the addition of bisulfite to the double bonds in the surface molecules of a polyester foam made containing maleic acid residues. In U.S. Patent 2,920,983 wettability is increased by treating the sponge with aluminum sulfate but such a method is erratic and effective only with certain types of polyester foam.

Variations in the composition of the foam is also known to influence wettability and water absorption. Thus if the polypropylene ether residues are replaced wholly or in part by polyethylene ether residues both wettability and water absorption are increased. This is true for both one-shot and for prepolymer foams. Similar effects are observed if nitrogen containing polyethers are used but in this case the amount of basic nitrogen that can be tolerated before undue catalysis of isocyanate reaction occurs is limited. There are disadvantages in replacing propylene ether groups by ethylene ether groups. If the amount is sufficient (about 50%) to produce an effect on wettability the foam is low in tensile strength and swells appreciably when wet. The inclusion of fillers such as starch, cellulose flock or wood floor also increases wettability but when added in an amount sufficient to have an effect on wettability also causes trouble in the foaming reaction. Thus items 8 and 9 in the table are commercial sponges made in this way but the densities are rather high and the material has a dead feel and lacks springiness.

To improve wettability it is more logical to change the nature of the surface than to change the entire resin composition. Much of the prior art is concerned with such an approach but the results are not satisfactory and the effect is small. Perhaps the best is surface hydrolysis of a polyester foam but this method is tedious and the finished item still undergoes further degradation. Polyether foam would be more attractive as a starting material since it resists hydrolysis better but then no really satisfactory way has been discovered to improve its wettability. Polyurethane foam has the great attraction in that it is flexible when dry or wet rather like a natural sponge. Natural sponges, while they are excellent from the point of view of wettability are difficult to produce. On the other hand cellulose sponges suffer from the disadvantage that they are hard when dry and will readily grow molds. Polyvinyl alcohol-formal sponges are extremely tough and wettable but they too are hard when dry.

The present invention provides a method whereby urethane foam based on polyester, polyether or polyformal and made by a one-shot or a prepolymer process may be easily treated after it has been made to give a sponge which has a remarkable affinity for water and as the figures in the table show a wettability as high as anything shown by conventional sponges and considerably higher than any polyurethane sponge known at this time. The resulting sponge is flexible and has the further added virtue that the treatment given it to increase wettability also results in a repellant effect on dirt and grime. Thus if an automobile is washed with a piece of polyether foam treated and untreated, the treated piece will wash clean in water by far the faster.

The behavior of various commercially available sponges and foams is given in the table together with the enhancement of wettability produced by the treatment of the present invention. The method of test was as follows: A poorly wettable sponge will float indefinitely on water but the amount of water taken up in a specified time is a measure of wettability. The period of time chosen was one minute and the amount of water that could be squeezed from the sample is recorded in milliliters. The samples were of standard size (4 x 6 x 1") and were soaked in water and squeezed by hand before the test. Dry sponges could have been used in the test but the results are more erratic and depend on the method of drying. If the wettability is high then water rapidly penetrates through to the upper surface of the test sample. If this happened within the one minute period then the time in seconds for the penetration is recorded. Clearly the more desirable sponges are the ones for which seconds rather than milliliters is given.

The same test method was applied to the samples of urethane material after treating them according to the teachings of the present invention. These are given in parentheses and it will be noted that the treatment uniformly gives times of penetration of from 1 to 5 seconds whatever the behavior had been before treatment. Figures of the order of 1 or 2 seconds indicates high wettability and the speed of penetration is then more determined by the rate of flow of water into the pores than by wettability. Figures for the treated sponges indicates that they are as good or better than the best sponges available.

Water absorption is also recorded in the table as a ratio of the weight of a sample after soaking in water and then hanging by a corner for five minutes to that after drying in an oven at 70° C. for two hours. It has already been said that this figure is not too important in defining a good sponge since it depends more on pore size and shape than on wettability.

The treatment of the present invention which results in a greatly increased wettability of polyurethane foam consists in applying a surface layer of finely divided silica. Suitable silica is available either as a powder or as a dispersion in water or other solvent or dispersion medium. The material "Cab-O-Sil," made and sold by Geoffrey L. Cabot, is suitable. This silica is described as a "submicroscopic particulate silica prepared in a hot gaseous environment (1100° C.) by the vapor phase hydrolysis of a silicon compound. This method of preparation, which is unusual for a silica, results in a product entirely different from other commercial siliceous pigments prepared by aqueous precipitation processes." The material "is not to be confused with silica gels, silica aerogels or other precipitated silicas." The particle size is given as between 0.015 to 0.020 micron. The quotations are from Geoffrey L. Cabot Inc. literature designated CGen-1, January 1955, revised August 1859, and CP1a-2, January 1955, revised August 1959.

Analogous silica is also sold by Philadelphia Quartz Company and called "finely divided silica, QUSO–FF and QUSO–GG." This company in their Bulletin 18–3, 18–3–959 gives the particle size as 0.012 micron (12 millimicrons).

Dispersions are available commercially. The material "Ludox" (Du Pont) is described as a colloidal silica. Grades HS and LS contain 30% silica as particles measuring 0.015 micron and have a pH of 9.8 and 8.4 respectively grade SM contains 15% silica with a particle size of 0.007 micron and a pH of 8.5. These dispersions are made according to the teachings of U.S. Patents 2,574,902 and 2,577,485. The particles are charged negatively and the dispersions contain a little alkali.

Silimar dispersions are known as the "Nalcoags" (National Aluminate Corporation). The data for different grades are

| Grade | Silica, percent | Micron | pH |
|---|---|---|---|
| 1015 | 15 | 0.007–0.009 | 8.6 |
| 1030 | 30 | 0.011–0.016 | 10.2 |
| 1035 | 35 | 0.016–0.022 | 8.6 |
| 1022 | 22 | 0.016–0.022 | 3.7 |

Each of the silicas just mentioned is described in the appropriate literature as having essentially spherical particles. This differentiates them from colloidal solutions of so-called silicic acid which are believed to have long chain-like and branched micellar molecules or particles. In the present invention the particle size appears crucial for success since colloidal silicic acid which possesses particles somewhat larger than those listed above does not appear to work. Neither does diatomaceous silica such as available under the trade name "Celite" (Johns-Manville) have any effect whatever in the present process. It is believed that there is an upper particle size which limits effectivtness in the present invention. All the above listed dispersions and the powders "Cab-O-Sil" and QUSO–FF and GG work excellently in the present invention and it is believed that the particle size may rise to several orders of magnitude greater before the material would become useless. It is thought that the particle size determines the way in which the silica fits on the surface of the foam and the tenacity of its bond. It is believed therefore that any silica particle of sufficiently small size would be effective in the present use.

In practicing the process of the present invention it is sufficient to disperse by agitation the dry powdered silica in water or other medium. No dispersing agent need be added but one may be used to give better penetration and initial wetting of the foam. A dispersing agent also minimises settlement of the silica from the dispersion on standing. Suitable dispersing agents are given in the literature dealing with "Ludox." Any organic liquid may be used instead of water and methanol, ethanol, acetone, ethyl methyl ketone, carbon tetrachloride, benzene, xylene and ethylene glycol have been successfully tried. Mixtures of solvents may be used and mixtures of water and water miscible solvents have particular merit in that, unlike the water-free solvents, the mixtures do not cause extreme swelling of the foam and consequent drop in tear strength. The dispersion "Nalcoag 1022" contains an alcohol.

The commercially available dispersions may be employed preferably diluted with water or some aqueous solvent mixture. Suitable concentrations range from as low as 0.1% to as high as can be made. Dispersions of dry silica in water without added dispersing agents will gel on standing if the concentration of the silica is above about 10%. A convenient concentration is between 1 and 2%. Although dispersing agents may be present, on the whole the process is most effective in their absence from that point of view of tenacity of retention of the silica on the surface. This must be balanced against stability of the dispersion and settlement since dispersing agents aid dispersion and retard settlement.

It is sufficient in the practice of the invention to immerse the foam in the dispersion and squeeze to aid penetration. The coating is established extremely rapidly and temperatures need not be elevated although the process has been successfully carried out at 70° C. There seems to be no added virtue in raising temperature. It has been found, however, that the efficacy of the silica treatment is vitally dependent on pH of the medium used in treating the foam. For example "Nalcoag 1015" which has a pH of 8.6 can be applied directly to the foam and then washed and the improved wettability is apparent but on continued washing in clean water the wettability disappears. If a piece of foam is treated in such a dispersion and then dried and baked the effect does develop some permanence but it has been found that the silica is rapidly and irreversibly transferred to the foam if the pH is lowered below about 6. It is preferable that the pH be lowered to between 0 and 3 by adding acid either organic or inorganic. The silica is then not removed by washing. Polyester foam is slightly more difficult to treat than polyether foam in that for the best effect the pH should be lower, between 0 and 3 is excellent for both types of foam.

The amount of silica that is deposited on the foam is extremely minute and cannot be easily estimated but the wettability that is imparted is very high as shown by the figures in the table. The treatment with silica carried out in order to produce the data recorded in the table was made using a 2% dispersion of Cab-O-Sil in water containing hydrochloric acid to give it a pH of 1.0. It is of interest to note that in contrast to the remarkable effect of traces of silica on the surface the addition of up to 10% Cab-O-Sil to the ingredients before foaming gives no apparent increase in wettability.

Of the commercially available dispersions only "Nalcoag 1022" is highly substantive without first lowering the pH. This dispersion contains alcohol and what seems to be a dispersing agent. Its pH is 3.7.

The practice of the invention may be carried out with success using a silica concentration of between 1 and 2% and a pH of 1.0. These figures are illustrative and are not limiting. Thus the silica concentration may be ten times lower with still excellent results and the pH may be between 6 and −1.0. An appreciable acidity is preferable because the foam itself as manufactured tends to be basic and the accumulation of base in the silica dispersion will cause a rise of pH and ultimate failure of the treatment. Conversely high acidities are disadvantageous from a practical point of view because of problems of corrosion. For this reason phosphoric acid is to be preferred to hydrochloric, alternatively good results have been obtained using a 1 to 5% solution of acetic acid. Formic acid is also usable. The dispersion on standing tends to separate into a lower silica rich layer and an upper water phase. Gentle agitation soon redisperses the silica and the treatment of the foam proceeds with the same efficiency as originally. Dispersions of Cab-O-Sil in dilute acid have been used for months and there is no apparent deterioration.

The deposit of silica seems to be very tenacious and is not removed by repeated washing in hot or cold water containing synthetic detergents. The only problem results when a fatty acid soap is used. There is a temporary loss of wettability due, possibly, to the deposition of fatty acid on the silica. On further washing in water or other detergent solution, wettability is regained. The silica layer has another valuable property that has already been referred to. This is its effect in repelling dirt and grime. This effect is known in other situations in fact "Ludox" is sold for the express purpose of reducing the soiling of carpets and wallpaper in use.

In the manufacture of useful and attractive sponges by the present invention it is recommended that the foam be first colored and then treated with silica dispersion. Coloring may be done by the use of cotton substantive or dispersible dyes. Alternatively color may be applied from organic medium or by the use of vat or reactive dyes. After dyeing the sponge is treated with silica and then washed and dried at ordinary or elevated temperatures. Coloring may follow silica application but with some dyes the wettability is adversely affected.

The overall process of converting the preformed polyurethane foam into a wettable urethane sponge is set out in the attached flow-sheet. Pieces of foam of a suitable size and cell structure are first colored by some suitable dyeing step (1). The pieces are then immersed in a dispersion of silica (2) of a nature as has been described previously. The pieces are then squeezed and washed in clean water to remove any superfluous acidic material (3) and finally dried (4) to give the finished sponge item having enhanced wettability.

*Wettability and water absorption of foams and sponges*

| Type | Pore structure | Specific gravity | Water uptake or penetration | Absorption, wet wt./dry wt. |
|---|---|---|---|---|
| 1.[1] Polyvinyl formal | Fine | 0.03 | 1 sec. | 9.5 |
| 2.[1] Cellulose | Coarse | 0.045 | 6 sec. | 12.6 |
| 3.[1] do | Fine | 0.045 | 1.5 sec. | 17.0 |
| 4.[1] Polyester-urethane | Coarse | 0.03 os | 9 ml. (5 sec.) | 14.0 (10.9) |
| 5.[1] do | do | 0.03 os | 21 ml. (3 sec.) | 9.6 (9.5) |
| 6.[1] do | Fine | 0.03 os | 6 ml. (1 sec.) | 9.7 (12.0) |
| 7 do | do | 0.05 pp | 10 ml. (1.5 sec.) | 9.5 (10.5) |
| 8.[1][2] do | do | 0.06 os | 6 sec. (1 sec.) | 10.0 (11.0) |
| 9.[1][2] do | do | 0.04 os | 59 ml. (1 sec.) | 9.5 (10.0) |
| 10 do | do | 0.02 os | 12 ml. (1 sec.) | 14.0 (15.0) |
| 11.[3] do | do | 0.02 os | 90 ml. (2 sec.) | 15.0 (16.0) |
| 12 do | do | 0.035 pp | 8 ml. (1 sec.) | 10.0 (12.0) |

[1] These are commercial sponges.
[2] Also contained cellulose flock, ethylene oxide type.
[3] Treated with polyvinyl alcohol and formaldehyde.
os refers to one-shop and pp to prepolymer types.
Figures in parentheses denote behavior after treatment according to the present invention.

What I claim is:

A polyurethane foam of enhanced wettability having finely divided silica deposited on its pore surfaces said silica being an adsorbed layer of essentially spherical particles having a particle size in the range 0.007–0.022 micron.

References Cited by the Examiner

UNITED STATES PATENTS

| | | | |
|---|---|---|---|
| 2,895,603 | 7/1959 | Freeman | 260—2.5 X |
| 2,900,278 | 8/1959 | Powers et al. | 117—98 |
| 2,920,983 | 1/1960 | Bugosh | 117—98 |
| 2,926,390 | 3/1960 | Tulalay et al. | 117—98 X |
| 3,004,921 | 10/1961 | Stossel | 260—2.5 |
| 3,024,209 | 3/1962 | Ferrigno | 260—2.5 |
| 3,057,750 | 10/1962 | Bennett et al. | 117—98 |
| 3,094,433 | 6/1963 | Bugosh et al. | 117—98 |

WILLIAM D. MARTIN, *Primary Examiner.*

RICHARD D. NEVIUS, *Examiner.*

D. TOWNSEND, T. G. DAVIS, *Assistant Examiners.*